July 19, 1955   C. R. EKHOLM   2,713,503
REINFORCED EXPANSION JOINT
Filed March 8, 1950   2 Sheets-Sheet 1

INVENTOR.
Carl R. Ekholm
By: Moore, Olson & Trexler
attys.

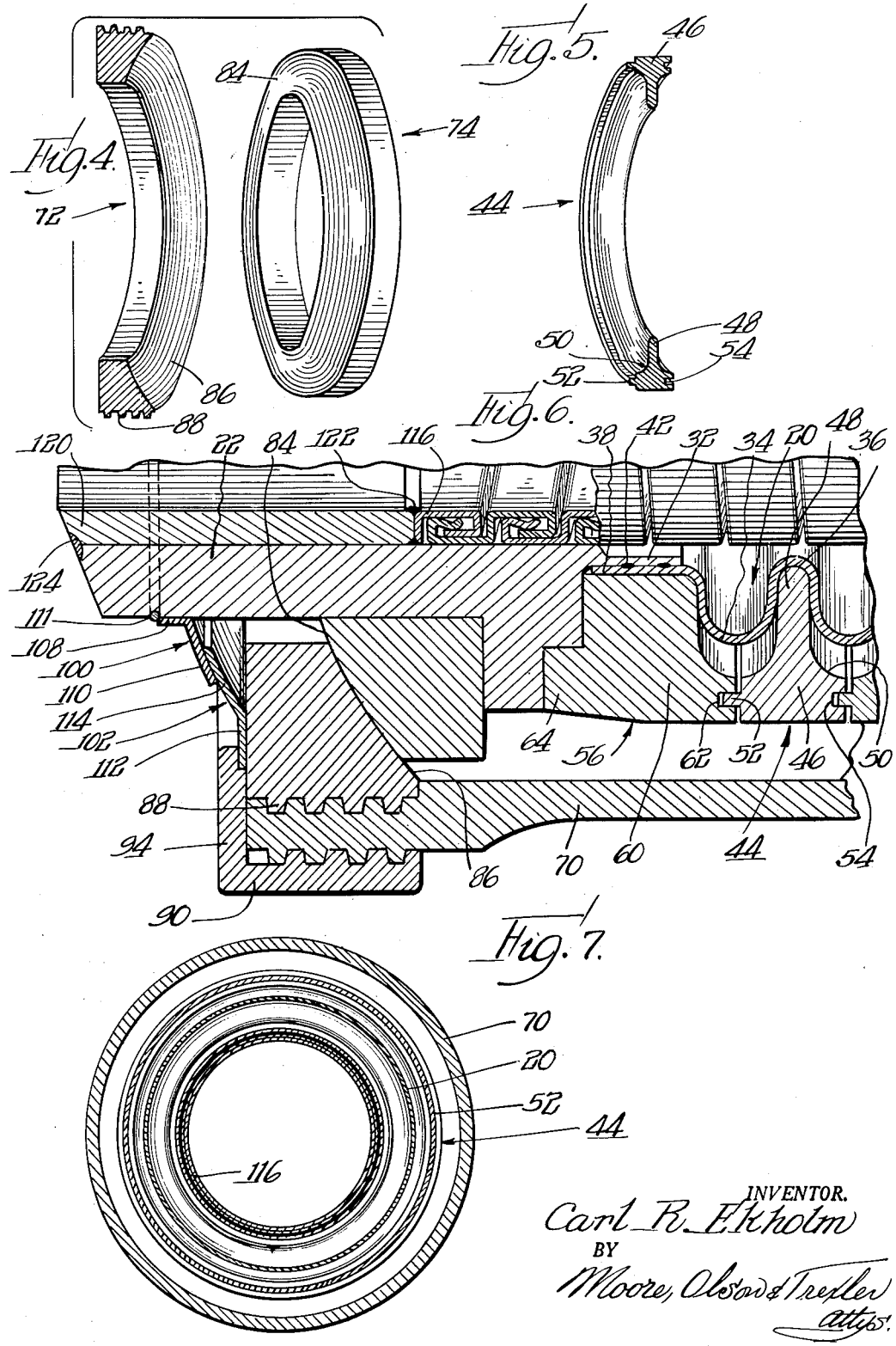

United States Patent Office 2,713,503
Patented July 19, 1955

2,713,503

REINFORCED EXPANSION JOINT

Carl R. Ekholm, Elgin, Ill., assignor to Chicago Metal Hose Corporation, Maywood, Ill., a corporation of Illinois Application March 8, 1950, Serial No. 148,395

6 Claims. (Cl. 285—92)

This invention relates to expansion units for conduits, pipe lines and the like, and concerns particularly expansion units for use in high pressure assemblies.

In the conventional application of expansion units to conduits the shiftable or expansion member is inserted coaxially between two adjacent, relatively rigid pipe sections so as to absorb the relative motion therebetween resulting from thermal expansion and contraction of the rigid pipe sections or other causes inducing relative motion therebetween.

Such installations are provided with hangers or anchors for supporting and holding the rigid pipe sections. In instances where the pipe line is adapted to conduct a fluid under pressure the hangers or anchors are required to resist the axial thrust imparted to the rigid pipe sections due to the fluid pressure as well as the axial force required to effect the compression or expansion of the expansion unit. In rigid pipe the axial forces set up by the pressure of the conducted fluid are balanced out and absorbed by the wall tension of the rigid pipe; however, the introduction of a yieldable expansion unit in the line produces a condition of unbalance in the adjacent rigid pipe sections equal to the product of the fluid pressure and the area of the flow section.

Large pipe line installations or installations wherein fluids are being conducted under high pressures present difficult problems since the unbalanced forces referred to above produce an axial thrust upon the rigid pipe sections which may become very large. This requires the use of strong and expensive hangers and anchorage means for the conduit sections which are not only costly and cumbersome but may also tend to interfere with the proper operation of the expansion joint.

In larger sizes of expansion units and particularly in those units which must withstand high fluid pressures, it is desirable to provide means to limit and in some instances preclude various types and combinations of motions to which the unit is subjected. The limiting means used heretofore have often been costly, unwieldy in use, difficult to install and repair, and otherwise generally unsatisfactory. The limiting means in addition to its primary function of limiting the motion imposed upon the expansion unit should protect the relatively fragile, flexible member in the expansion unit. More particularly in those cases in which the flexible member is a convoluted tubing the limiting means should support the convolutions of the tubing whereby to prevent collapse thereof and should protect the flexible tubing from physical loads.

In accordance with the present invention means and methods are provided for utilizing expansion units in pipe lines in a manner so as to neutralize or avoid the setting up of the forces of unbalance described above whereby to reduce the load upon the pipe line anchors or supports substantially to the dead weight or gravity load of the pipe line. More specifically means and methods are provided whereby the internal pressures of the fluid being conducted are absorbed within and maintained by the expansion unit itself. Furthermore, means and methods are provided for limiting or precluding certain motions to which the expansion unit is subjected and means is provided for protecting the flexible member of the expansion unit.

Accordingly it is an object of the present invention to provide an expansion unit of improved construction and improved operating characteristics.

More specifically it is an object of the invention to provide an expansion unit particularly adapted for use in high pressure conduits wherein the internal pressures of the conducted fluids and forces set up thereby are neutralized and absorbed in an improved manner.

Another object of the invention is to provide an improved expansion unit particularly for use in high pressure installations having means to limit certain of the motions to which the expansion unit is subjected and to protect the relatively fragile, flexible member of the expansion unit.

A further object is to provide an improved expansion unit which includes means to hinder or prevent escape of the medium being conducted in the event that the flexible member of the expansion unit fails.

Yet another object is to provide an expansion unit of the type set forth which is more easily installed and more economically prepared; more specifically it is an object to provide an expansion unit which does not require special aligning during installation, which allows insulation to be readily attached thereto, and in which all parts with the exception of the flexible member can be readily salvaged in the case of failure of the expansion unit.

Various other objects, advantages and features of the invention will be apparent from the following specification when taken in connection with the accompanying drawings wherein a preferred embodiment of the invention is set forth for purposes of illustration.

In the drawings wherein like reference numerals have been used to refer to like parts throughout:

Figure 4 is a perspective view of one pair of the comating bearing members shown in Figures 1–3, the outer bearing member being shown in cross section;

Figure 5 is a partial perspective view of one of the reinforcing rings used in the expansion unit;

Figure 6 is a partial cross sectional view yet further enlarged showing certain details of construction; and Figure 7 is a cross sectional view of the expansion unit shown in Figure 2 substantially as seen in the direction of the arrows along the line 7—7 therein.

Figure 1:
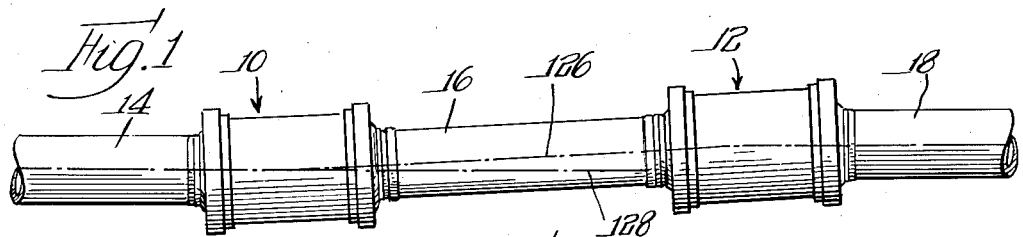
Figure 1 is a general assembly view of a pair of expansion units embodying the principles of the present invention shown in position in a pressure carrying conduit to provide an expansion joint.

Referring more specifically to the drawings, in Figure 1 there is shown a pipe line installation including a pair of expansion units generally designated by the numerals 10 and 12 made in accordance with and embodying the principles of the present invention. The pipe line installation comprises a first pipe section 14 which is connected to one end of expansion unit 10, an intermediate pipe section 16 inserted between the adjacent expansion units 10 and 12, and a second pipe section 18 connected to the other end of expansion unit 12. The pipe sections 14 and 18 in Figure 1 are shown in a laterally offset condition wherein the expansion units 10 and 12 are flexed or shifted from the neutral or normal position.

Figure 3:
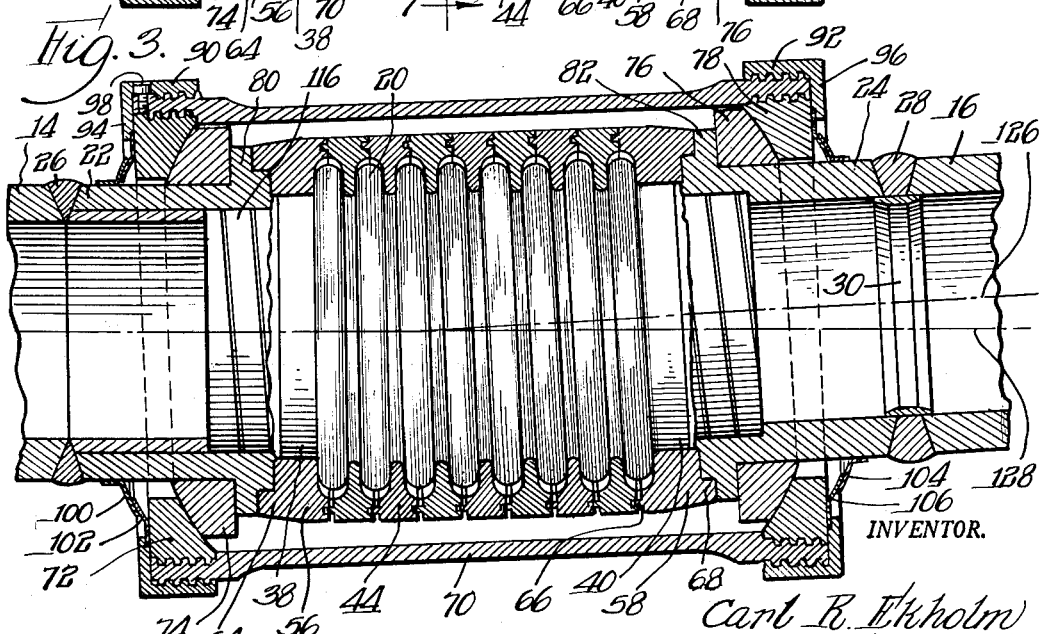
Figure 3 is a vertical cross sectional view similar to Figure 2 showing the expansion unit in its flexed or shifted position.

As will be more particularly hereinafter described, the expansion unit of the present invention is precluded from axial motion but is capable of partaking of lateral movement between its ends or partaking of bending movement as illustrated in Figure 3. Assemblies such as the ones shown in Figure 1 permit relatively large lateral movements between the pipe sections 14 and 18 and radial movement between these pipe sections, such motion for example being induced by thermal expansion of the pipes or other causes. Although the individual expansion units 10 and 12 can partake of only limited amounts of bending and offset motion, interconnecting two of the units by an intermediate pipe section 16 allows this motion in effect to be amplified whereby to permit a relatively large amount of movement between the pipe sections 14 and 18. By increasing the length of the intermediate pipe section 16, the range of movement will be correspondingly increased.

Referring more specifically to Figures 2–7 there is shown therein an expansion unit incorporating the principles of the present invention. For purposes of expanation only one of the expansion units, namely, expansion unit 10 will be described in detail. It is to be understood that expansion unit 12 is constructed in the same manner as expansion unit 10 and functions in the same way. Expansion unit 10 comprises a length of flexible metal tubing 20 disposed between and interconnecting in a fluid tight manner a pair of circular end members or flanges 22 and 24. The end members 22 and 24 are connected to the adjacent pipe sections as by welding at 26 and 28. Instead of welding end members 22 and 24 to the adjacent pipe sections it is within the spirit of the invention to provide laterally extending flanges thereon which could be connected to flanges on the adjacent pipe sections. To give greater strength to the weld 28 an internal circular band or collar 30 has been shown in position within end member 24 and pipe section 16 whereby to overlie the junctions between the weld 28 and the ends of end member 24 and pipe section 16.

The external diameter of the inwardly facing ends of end members 22 and 24 are reduced to provide flanges such as the flange 32 shown in Figure 6 to which are attached the ends of the flexible metal tubing 20. The tubing 20 is preferably of the annular corrugated one-piece type formed from a cylindrical blank either drawn or longitudinally seam-welded from sheet stock. Such a tubing provides external convolutions 34 between which are formed internal convolutions or recesses 36 and a pair of axially extending circular flanges 38 and 40. The internal diameter of flanges 38 and 40 is of such a size as to fit over the flanges 32 formed on the end members 22 and 24. These end flanges are held in fluid tight assembled position by welds such as at 42 in Figure 6. As will be pointed out more fully hereinafter, the welded connection 42 carries a minimum of structural strain and serves primarily to form a fluid tight connection between the flexible member 20 and the end members 22 and 24.

A plurality of reinforcing elements or rings generally designated by the numeral 44 encircle and embracingly engage the convolutions of the flexible metal tubing 20. There has been shown for purposes of illustration an integral interlocking type of reinforcing ring 44 but it is to be understood that other suitable types of reinforcing rings such as split rings or multiple piece self-locking rings may be used. The integral laterally interlocking type of rings 44 are particularly suited for use in the present invention since there are no projections formed thereon to interfere with the longitudinal restraining means to be described hereinafter.

Referring more particularly to Figures 5 and 6 there is shown the cross section of rings 44. Rings 44 comprise a body 46 having a radially inwardly directed projection 48 formed integrally therewith. Projection 48 extends into the recess 36 of flexible tubing 20 and contactingly engages the surface thereof around the entire circumference. In the form of reinforcing ring shown, the convolutions on the flexible metal tubing 20 are formed with the rings 44 in position whereby to contactingly deform the material defining the recess about projection 48. The junction between the body 46 and the projection 48 is rounded as at 50 to conform to the shape of the outermost portion of the convolutions 34 whereby to prevent sharp corners from wearing against the flexible metal tubing. Formed on the lefthand side of ring 44 as viewed in Figures 5 and 6 is a laterally projecting flange 52 which extends around the circumference of the reinforcing ring 44. The righthand side of each ring carries a flange receiving groove 54 which also extends around the circumference of ring 44 and is adapted to receive the laterally projecting flange 52 from an adjacent reinforcing ring.

A modified form of reinforcing ring is provided at each end of the expansion unit as at 56 and 58. Referring to Figure 6, ring 56 is provided with a body portion 60 which extends around the circumference of the flexible metal tubing 20 and grippingly engages the circular flange 38 of flexible metal tubing 20 against flange 32 of the end member 22. The frictional engagement of end 38 between flange 32 and ring 56 relieves the weld 42 of substantially all the mechanical strain to which it might be subjected. The righthand side of ring 56 as seen in Figure 6 has formed thereon a flange receiving groove 62 adapted to receive the flange 52 of the adjacent reinforcing ring 44. The lefthand side of ring 56 is provided with a laterally extending flange 64 which cooperates with a groove formed in end member 22 whereby to keep ring 56 and member 22 aligned.

Ring 58 at the righthand end of the expansion unit is shaped similarly to ring 56 but instead of carrying a flange receiving groove has formed thereon a laterally extending flange 66 (see Figure 2) which cooperates with a groove in the adjacent reinforcing ring. The righthand circular flange 40 of flexible metal tubing 20 is also grasped between ring 58 and the flange on end member 24 whereby to relieve the weld between flange 40 and end member 24 or substantially all of the mechanical strain thereon. A second laterally extending flange 68 on ring 58 cooperates with a groove in end member 24 to keep ring 58 and end member 24 properly aligned.

Figure 2:
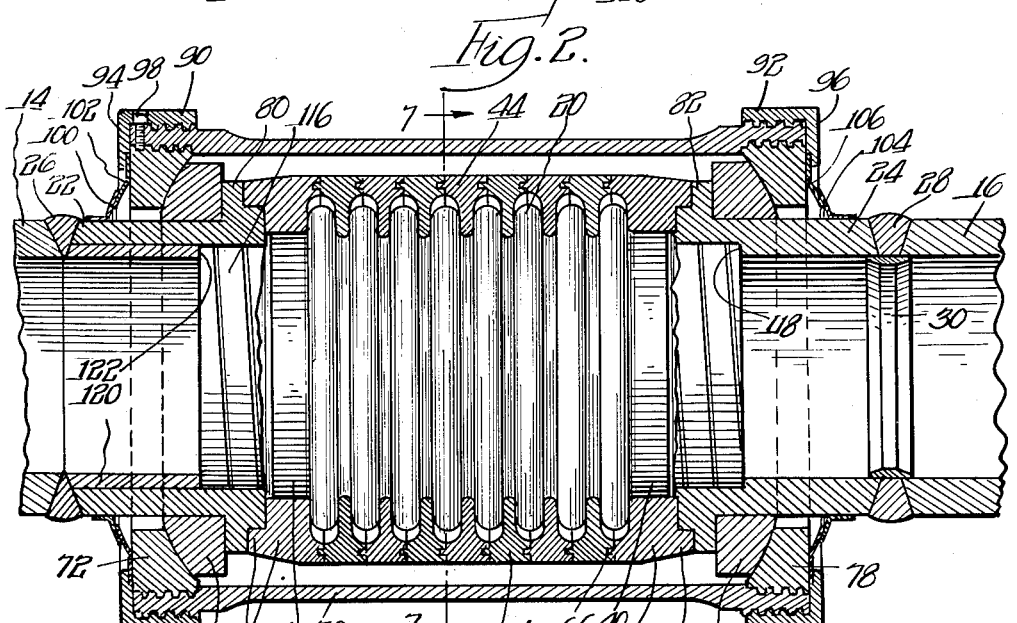
Figure 2 is an enlarged view in vertical cross section of one of the expansion units shown in Figure 1, the unit being shown in its normal position.

Referring now to Figures 2 and 3 there is shown the manner in which rings 44, 56 and 58 are assembled about the flexible metal tubing 20. The flanges 52 do not extend into groove 62 to the fullest extent when the expansion unit is in the normal or unflexed position, that is, the end of flange 52 is spaced away from the bottom wall of groove 62 as may be seen in Figure 6. It is apparent that the flanges abutting against the grooves in adjacent rings will definitely limit axial compression of the flexible metal tubing. In addition, the interlocking action of the laterally extending flanges and their cooperating grooves will limit lateral distortion, that is, will limit the amount that the middle convolutions can move laterally with respect to the longitudinal axis of the expansion unit. Lateral offset motion and radial bending motion are also limited by the action of the reinforcing rings. The reinforcing rings further serve to protect the fluid tight integrity of the tubing 20 by preventing the collapse of the recess 36 by reason of the presence of projections 48 therein. Yet another function is served by the interlocking feature of the rings and that is that the rings tend to carry one another when the ends of the expansion unit are subjected to a lateral offset or radial motion whereby to remove the mechanical stress or shifting the rings from the flexible metal tubing 20.

Means is provided for positively limiting the longitudinal expansion of unit 20. This limiting means includes a cylindrically shaped outer casing 70 which extends between and bears against the end members 22 and 24. A spherical bearing surface is formed between casing 70 and the end members 22 and 24 whereby to enable the longitudinal axis of the end members to be disposed at an angle with respect to the longitudinal axis of the casing 70. The spherical bearing surface is formed between bearing members 72 and 74 at the lefthand end of expansion unit 10 as seen in Figures 2 and 3 and bearing members 76 and 78 at the righthand end of unit 10. Referring to Figure 4 there is seen an enlarged view of bearing members 72 and 74, bearing member 72 being shown in section. All of the bearing members are circular and are shaped in the form of a ring whereby to completely surround their respective end members. Bearing members 74 and 76 have an internal diameter just slightly greater than the external diameter of end members 22 and 24 respectively whereby to fit thereupon and abut against laterally extending flanges 80 and 82 formed on the end members 22 and 24 respectively. It will be seen therefore that one side of the bearing members 74 and 76 will abut against the flanges 80 and 82 respectively. The other side of the bearing members are formed convex as shown at 84 in Figure 4 on bearing member 74.

The bearing members 72 and 78 are formed with complementary concave bearing surfaces such as the bearing surface 86 shown on bearing member 72 in Figure 4. The bearing surfaces 84 and 86 comate to form a completed spherical bearing unit whereby to allow motion between the outer casing 70 and the end members 22 and 24. The inner diameter of bearing members 72 and 78 is considerably greater than the outer diameter of the associated end members 22 and 24 whereby to allow the end members to partake of motion with respect to the bearing members as will be described more fully hereinafter. The outer circumference of the bearing members 72 and 78 are provided with screw threads as at 88 in Figure 4 which cooperate with complementary screw threads formed on the internal side of outer casing 70 at each end thereof.

Means is provided to lock the bearing members 74 and 78 in position on casing 70 in the form of cap members 90 and 92, see Figures 2 and 3. Cap members 90 and 92 are provided with screw threads which cooperate with complementary screw threads on the external surface of both ends of casing 70. Integral laterally and inwardly extending flanges 94 and 96 formed on cap members 90 and 92 respectively hold the bearing members 72 and 78 in fixed relationship with casing 70. To insure that the bearing members, the casing and the cap members are held in fixed relationship, a set screw such as set screw 98 shown in Figures 2 and 3 is provided which passes through the cap member and the casing and bears against the associated bearing member.

It will be seen that by providing the spherical bearing surfaces between bearing members 72—74 and 76—78 the end members 22 and 24 can partake of a limited amount of rotative motion with respect to casing 70 in any direction about the longitudinal axis of the expansion unit. While allowing the above described motion, the casing 70 and its associated bearing members positively prevent longitudinal expansion of the expansion unit. Outer casing 70 further serves to restrict the hazards encountered in the event that the pressure carrying tube 20 bursts when carrying hot, corrosive or otherwise dangerous materials. In the event of failure of tubing 20, the flow of material from the expansion unit will be minimized and in certain cases can be effectively stopped by providing sufficient bearing pressure between bearing members 72—74 and 76—78. In addition to the safety feature provided by this construction it also allows continued operation of the unit until the associated equipment can be conveniently shut down for repairs.

Means is provided to protect the spherical bearing surfaces on bearing members 72, 74, 76 and 78 more particularly to prevent dirt, metal particles and other deleterious materials from gaining access to the bearing surfaces whereby to roughen or otherwise impair the bearing surfaces. This protecting means comprises a guard member including two cooperating end clips, one pair of end clips 100 and 102 being positioned at one end of the expansion unit and a second pair of end clips 104 and 106 being positioned at the other end of the expansion unit.

The structure of the end clips can be best seen in Figure 6 where a cross section of the end clips is shown on an enlarged scale. End clip 100 includes a cylindrical portion 108 whose internal diameter is slightly greater than the external diameter of end member 22 whereby to allow clip 100 to fit snugly over end member 22. Formed integral with and extending radially from cylindrical portion 108 is a bearing portion 110 which extends completely around the circumference of clip 100. Referring to Figure 6 it is seen that the cross section of bearing portion 110 is formed in the shape of a segment of a sphere. End clip 100 is held in position upon end member 22 by means of a circular retaining member 111 which is disposed around the circumference of end member 22 in a groove formed therein. Retaining member 111 abuts against the outer edge of cylindrical portion 108 and effectvely holds clip 100 in position.

Clip 102 includes a fastening portion 112 which is adapted to be positioned radially with respect to the axis of the expansion unit and is grasped and held in position between flange 94 of cap member 90 and bearing member 72. A bearing portion 114 is formed integral with fastening portion 112 and is adapted to cooperate with the bearing portion 110. The cross section of bearing portion 114 is spherical as is bearing portion 110.

The two bearing portions 110 and 114 cooperate to completely seal the junction between the bearing member 72 and the end member 22 whereby to prevent dirt or other foreign materials from penetrating to the spherical bearing surface between bearing members 72 and 74. The clip members 104 and 106 are constructed in the same manner and serve the same function as clip members 100 and 102. In addition to keeping dirt from the bearing surfaces the end clips serve to aid in preventing longitudinal contraction of the expansion unit since the bearing portion 114 is positioned on the inside of bearing portion 110.

There has been shown in the drawings a liner disposed within the flexible metal tubing 20. The use of such a liner is optional but the liner serves to protect the relatively thin tube 20, particularly in those applications in which excessive corroding and eroding conditions are encountered. Examples of such applications are in exhaust pipe installations in which the exhaust gases are often at high temperatures and contain incandescent particles which tend to corrode metal in contact therewith and in high temperature, high velocity steam lines.

The liner shown in the present application is designated by the numeral 116 and comprises a length of spiral wound interlocking flexible metal tubing of a type known in the art. The righthand end of the liner 116, as may be seen in Figure 2, is received in an internal recess formed in end member 24 and is fastened to the shoulder formed therein in any suitable manner such as by welding at 118. The lefthand end of liner 116 is held in position and fastened to end member 22 by means of a cylindrical bushing 120 which is welded to the liner 116 as at 122 (see Figure 6), and which is fastened to the end member 122 as by welding at 124. The liner 116 is not pressure tight and therefore the flexible metal tubing 20 provides the pressure carrying member of the expansion unit. The liner 116 does serve to protect the relatively frangible flexible metal tubing from any corroding or eroding action of the fluid being carried by the expansion unit. Liner 116 must be flexible in nature to allow proper operation of the expansion unit.

The manner in which the bending motion is achieved using expansion unit 10 is illustrated in Figure 3. The unit has been shown in a condition in which the pipe section 16 has been turned vertically upwardly whereby to incline the axis 126 of pipe section 16 at an angle with respect to the normal horizontal axis 128 of the expansion unit. In turning pipe section 116 upwardly the tubing 20 has been flexed and the rings 44 have been compressed together at the upper side and spread apart at the lower side to accommodate this motion. The liner 116 has been curved in a similar manner. The bearing member 76 has been rotated upwardly with respect to the bearing member 76 and the end clips 104 and 106 have similarly shifted with respect to one another. Member 72 at the lefthand end of the expansion unit 10 has moved downwardly with respect to the fixed bearing member 74 and the associated end clips have similarly moved. It will be seen that the bearing surfaces are necessary in order to allow movement of pipe section 16 due to the presence of the inflexible casing 70. In the flexed position of the expansion unit the casing 70 still serves to limit the longitudinal expansion of the expansion unit whereby to prevent undue stress being placed on the flexible metal tubing 20. Due to the shape and configuration of the bearing members 72, 74, 76 and 78 the amount of motion of which pipe section 16 can partake is definitely limited since the motion will be positively stopped when the bearing members 74 and 76 bear against the outer casing 70.

The end clips serve their intended function even when the expansion unit is in the flexed position. More particularly the end clips prevent the entry of dirt into the bearing surfaces and limit axial contraction of the expansion unit.

There has been provided an expansion unit which fulfills all of the objects set forth above.

Although a preferred embodiment of the invention has been shown for purposes of illustration, it is obvious that various changes may be made in the specific embodiment set forth without departing from the spirit of the invention. The invention is accordingly not to be limited to the particular structure shown and set forth, but only as indicated in the following claims.

The invention is hereby claimed as follows:

1. An expansion joint for fluid conduits, comprising a pair of relatively shiftable end conduit members axially spaced from each other, an imperforate encasement sleeve overlying the adjacent end portions of the end conduit members and spaced radially outwardly therefrom, a bellows sealing tube interconnecting the adjacent ends of the end conduit members and fixedly secured thereto independently of and within said sleeve, a pair of ring bearing and sealing members disposed around each end conduit member and having co-mating concavo-convex swivel bearing surfaces therebetween, one bearing member of each pair being carried by the corresponding end conduit member in sealing relationship thereto and the other bearing member of each pair being secured to the adjacent end of said sleeve, and means including flanges on said end conduit members and a pair of coacting clip members associated with each end conduit member and said sleeve for resisting axial separation of the bearing members of each pair, and said sleeve preventing axial separation of the bearing members secured thereto.

2. An expansion joint as claimed in claim 1, wherein the flange of each end conduit member comprises an outward flange adjacent the inner end thereof in engagement with the adjacent bearing member.

3. An expansion joint as claimed in claim 1, wherein the clip members of each pair comprise a pair of dust excluding rings disposed around each end conduit member and having co-mating concavo-convex surfaces of engagement, one dust ring of each pair being secured to the adjacent end conduit member and the other dust ring of each pair being secured axially inwardly thereof and in engagement therewith to resist relative inward movement of the end conduit members and resultant axial separation of the bearing members.

4. An expansion joint as claimed in claim 1, wherein reinforcing rings embrace the convolutions of the bellows sealing tube and wherein the flange of each end conduit member comprises an outward flange at the inner end thereof engaging the adjacent bearing member and the end reinforcing ring at each end of the bellows sealing tube abuts the adjacent flange of the conduit member.

5. An expansion joint as claimed in claim 1, wherein each end conduit member includes an inwardly projecting flange and wherein each end of the bellows sealing tube includes a cylindrical portion telescoping over the adjacent flange and welded thereto, and wherein reinforcing rings embrace the convolutions of the bellows sealing tube with the end reinforcing rings overlying and engaging the corresponding cylindrical end portions of the bellows sealing tube to substantially eliminate strain on the welded connections between the ends of the bellows sealing tube and the flanges on the end conduit members.

6. An expansion joint as claimed in claim 1, wherein there is provided a corrosion resistant flexible liner tube disposed within the bellows sealing tube with the ends thereof mounted within the ends of the end conduit members.

References Cited in the file of this patent

UNITED STATES PATENTS

| Number | Name | Date |
|---|---|---|
| 137,557 | McDonald | Apr. 8, 1873 |
| 390,240 | Legat | Oct. 2, 1888 |
| 435,927 | Ginty | Sept. 9, 1890 |
| 570,405 | Jerguson et al. | Oct. 27, 1896 |
| 701,272 | Neil | May 27, 1902 |
| 755,204 | Witzenmann | Mar. 22, 1904 |
| 871,757 | Greenlaw | Nov. 19, 1907 |
| 1,051,046 | Witzenmann | Jan. 21, 1913 |
| 1,165,449 | Rietz | Dec. 28, 1915 |
| 1,425,635 | Dod | Aug. 15, 1922 |
| 1,726,483 | Giesler | Aug. 27, 1929 |
| 1,797,151 | Lord | Mar. 17, 1931 |
| 1,835,298 | Greene | Dec. 8, 1931 |
| 2,175,752 | Gray | Oct. 10, 1939 |
| 2,335,478 | Bergman | Nov. 30, 1943 |
| 2,673,748 | Shaw | Mar. 30, 1954 |

FOREIGN PATENTS

| Number | Country | Date |
|---|---|---|
| 209,839 | Great Britain | Jan. 21, 1924 |
| 694,163 | Germany | Aug. 23, 1940 |